United States Patent
Forrest (10) Patent No.: US 8,257,793 B2
(45) Date of Patent: Sep. 4, 2012

(54) ROLL TO ROLL FABRICATION OF MICROLENS ARRAYS FOR LOW COST LIGHT OUTCOUPLING FROM OLEDS

(75) Inventor: Stephen R. Forrest, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 1072 days.

(21) Appl. No.: 12/147,115

(22) Filed: Jun. 26, 2008

(65) Prior Publication Data

US 2009/0001620 A1 Jan. 1, 2009

Related U.S. Application Data

(60) Provisional application No. 60/937,677, filed on Jun. 29, 2007.

(51) Int. Cl.
  *B05D 1/00* (2006.01)
  *B05D 3/00* (2006.01)
(52) U.S. Cl. ........ 427/264; 427/162; 427/261; 427/265; 427/428.06
(58) Field of Classification Search .................. 427/162, 427/261, 264, 265, 428.06
See application file for complete search history.

(56) References Cited

U.S. PATENT DOCUMENTS

| | | |
|---|---|---|
| 5,703,436 A | 12/1997 | Forrest et al. |
| 5,707,745 A | 1/1998 | Forrest et al. |
| 5,844,363 A | 12/1998 | Gu et al. |

(Continued)

FOREIGN PATENT DOCUMENTS

| | | |
|---|---|---|
| EP | 0 256 803 | 2/1988 |
| JP | 2004 042475 | 2/2004 |

OTHER PUBLICATIONS

Chang et al., "Rapid fabrication of ultraviolet-cured polymer microlens arrays by soft roller stamping process", Microelectronic Engineering, Elsevier Publishers BV., Amsterdam,. NL, vol. 84, No. 2, 2007.

(Continued)

*Primary Examiner* — Frederick Parker
(74) *Attorney, Agent, or Firm* — Kilpatrick Townsend & Stockton LLP (57) ABSTRACT

A patterned roller, and a method of making the patterned roller, is provided. A patterned roller may be made by first forming a first mold having a negative pattern by etching pits in a flat mold surface with an etching process. Then, a second mold is formed having a positive pattern, by pouring a first curable material into the first mold, curing the first curable material, and removing the first curable material from the first mold. Then the patterned roller having the negative pattern is formed by coating a roller with a layer of a second curable material, pre-curing the second curable material to provide a viscous but not hardened surface, and rolling the roller over the second mold to create the negative pattern in the second curable material. The second curable material is then cured. Any of the curable materials may be coated after curing, preferably with metal, to reduce sticking in subsequent steps. The patterned roller may be used to create a pattern of microlenses in a third curable material. A substrate is coated with the third curable material. The patterned roller is rolled over the third curable material to transfer the pattern to the third curable material. The third curable material may then be cured.

21 Claims, 6 Drawing Sheets

U.S. PATENT DOCUMENTS

| | | | |
|---|---|---|---|
| 6,097,147 | A | 8/2000 | Baldo et al. |
| 6,303,238 | B1 | 10/2001 | Thompson et al. |
| 6,984,934 | B2 | 1/2006 | Moller et al. |
| 7,279,704 | B2 | 10/2007 | Walters et al. |
| 2002/0121339 | A1* | 9/2002 | Ikeda et al. ............ 156/307.1 |
| 2003/0230980 | A1 | 12/2003 | Forrest et al. |
| 2004/0174116 | A1 | 9/2004 | Lu et al. |
| 2005/0083571 | A1 | 4/2005 | Shimizu |
| 2006/0087741 | A1 | 4/2006 | Shimizu |

OTHER PUBLICATIONS

Search Report and Written Opinion corresponding to the PCT/US2008/068562 application dated Feb. 6, 2009.

C. Kim et al., "Micropatterning of organic electronic devices by cold-welding," Science, vol. 288, pp. 831, 2000.

C. Kim et al., "Patterning of active organic materials by direct transfer for organic electronic devices," J. Appl. Phys., vol. 97, pp. 113512, 2005.

C. Kim et al., "Fabrication of organic light-emitting devices by low pressure cold welding," Adv. Mat. vol. 15, pp. 541, 2003.

S. Moller et al., "Improved light outcoupling in organic light emitting devices employing ordered microlens arrays," J. Appl. Phys., vol. 91, pp. 3324, 2001.

Y. Sun et al., "Organic light emitting devices with enhanced outcoupling via microlenses fabricated by imprint lithography," J. Appl. Phys., vol. 100, pp. 073106, 2006.

* cited by examiner

ROLL TO ROLL FABRICATION OF
MICROLENS ARRAYS FOR LOW COST
LIGHT OUTCOUPLING FROM OLEDS

This application claims priority to U.S. Provisional Patent Application 60/937,677, filed Jun. 29, 2007, which is incorporated by reference.

The claimed invention was made by, on behalf of, and/or in connection with one or more of the following parties to a joint university corporation research agreement: Regents of the University of Michigan, Princeton University, The University of Southern California, and the Universal Display Corporation. The agreement was in effect on and before the date the claimed invention was made, and the claimed invention was made as a result of activities undertaken within the scope of the agreement.

FIELD OF THE INVENTION

The present invention relates to light emitting devices. More specifically, the present invention relates to structures for enhanced outcoupling, and methods for achieving those structures.

BACKGROUND

Opto-electronic devices that make use of organic materials are becoming increasingly desirable for a number of reasons. Many of the materials used to make such devices are relatively inexpensive, so organic opto-electronic devices have the potential for cost advantages over inorganic devices. In addition, the inherent properties of organic materials, such as their flexibility, may make them well suited for particular applications such as fabrication on a flexible substrate. Examples of organic opto-electronic devices include organic light emitting devices (OLEDs), organic phototransistors, organic photovoltaic cells, and organic photodetectors. For OLEDs, the organic materials may have performance advantages over conventional materials. For example, the wavelength at which an organic emissive layer emits light may generally be readily tuned with appropriate dopants.

OLEDs make use of thin organic films that emit light when voltage is applied across the device. OLEDs are becoming an increasingly interesting technology for use in applications such as flat panel displays, illumination, and backlighting. Several OLED materials and configurations are described in U.S. Pat. Nos. 5,844,363, 6,303,238, and 5,707,745, which are incorporated herein by reference in their entirety.

As used herein, "top" means furthest away from the substrate, while "bottom" means closest to the substrate. Where a first layer is described as "disposed over" a second layer, the first layer is disposed further away from substrate. There may be other layers between the first and second layer, unless it is specified that the first layer is "in contact with" the second layer. For example, a cathode may be described as "disposed over" an anode, even though there are various organic layers in between.

More details on OLEDs, and the definitions described above, can be found in U.S. Pat. No. 7,279,704, which is incorporated herein by reference in its entirety.

SUMMARY OF THE INVENTION

A patterned roller, and a method of making the patterned roller, is provided. A patterned roller may be made by first forming a first mold having a negative pattern by etching pits in a flat mold surface with an etching process. Then, a second mold is formed having a positive pattern, by pouring a first curable material into the first mold, curing the first curable material, and removing the first curable material from the first mold. Then the patterned roller having the negative pattern is formed by coating a roller with a layer of a second curable material, pre-curing the second curable material to provide a viscous but not hardened surface, and rolling the roller over the second mold to create the negative pattern in the second curable material. The second curable material is then cured. Any of the curable materials may be coated after curing, preferably with metal, to reduce sticking in subsequent steps.

The patterned roller may be used to create a pattern of microlenses in a third curable material. A substrate is coated with the third curable material. The patterned roller is rolled over the third curable material to transfer the pattern to the third curable material. The third curable material may then be cured.

DETAILED DESCRIPTION

Microlens arrays are a proven technology for about 1.8 to 2 times improvement in light outcoupling from OLEDs fabricated on glass substrates. Briefly, microlenses are hemispherical lenses or similarly shaped bumps whose diameters are much less than the emitting pixel size. In our early demonstration of such lens arrays, we have found that diameters of approximately 10 microns, forming a close packed array of lenses are optimal, as further outcoupling improvements are not realized by making larger lens diameters. The simplest way of making such arrays is by pouring a polymer into a hemispherical mold, curing the polymer, and then removing the mold to leave the lenses behind on the substrate. Stamping, or imprinting of the hemispherical patterns onto a substrate precoated with a polyimide is an excellent way to obtain the desired shape, and hence significantly enhanced outcoupling. U.S. Pat. No. 6,984,934 to Moller et al. is incorporated by reference for its disclosure of microlenses (col. 4 line 22-col. 8 line 67), theory of microlens operation (col. 9 line 1-col. 10 line 12) and microlens fabrication and experimental results (col. 10 line 13-col. 12 line 11).

For practical lighting applications, it is desirable that the production of microlens arrays directly onto the OLED substrate surface be done quickly and precisely, and at a very low cost. Hence, we prefer to move away from conventional batch processes as has been done previously by our laboratory, to adopt continuous printing-type technologies. A roll-to-roll method is provided for application of hexagonal close-packed arrays of 10 micron diameter microlenses directly onto the surface of glass substrates. The opposite glass surface is left flat for eventual deposition of the desired white emitting phosphorescent WOLED structures, or other light emitting structures.

There is a significant degree of demonstrated expertise by the University of Michigan group in stamp patterning (C. Kim, P. E. Burrows, and S. R. Forrest, *"Micropatterning of Organic Electronic Devices by Cold-Welding,"* Science, vol. 288, pp. 831, 2000, C. Kim, Y Cao, W. O. Soboyejo, and S. R. Forrest, *"Patterning of Active Organic Materials by Direct Transfer for Organic Electronic Devices,"* J. Appl. Phys., vol. 97, pp. 113512, 2005 and Kim and S. R. Forrest, *"Fabrication of organic light-emitting devices by low pressure cold welding,"* Adv. Mat., vol. 15, pp. 541, 2003) and microlens design. (S. Moller and S. R. Forrest, *"Improved light outcoupling in organic light emitting devices employing ordered microlens arrays,"* J. Appl. Phys., vol. 91, pp. 3324, 200 and Y. Sun and S. R. Forrest, *"Organic light emitting devices with enhanced outcoupling via microlenses fabricated by imprint lithography,"* J. Appl. Phys., vol. 100, pp. 073106, 2006). While most of the stamping technology has been developed for flat surfaces, more recently, we have pioneered the stamping of active organic devices (photodetectors) on 3D hemispherical surfaces to make curved focal plane detector arrays. Thus, past research has involved stamping of both active and passive structures.

One process illustrated herein is a 2 times stamp-and-release process. The starting point is to etch an array of hemispherical cavities into a 6" diameter 'parent' Si wafer. This process may be accomplished by deposition of a $Si_2$ or $SiN_x$ layer onto the Si surface, patterning an array of holes into the insulator, and then over etching a hole into the Si using an isotropic wet etchant. The residual insulating layer is then removed from the Si surface. This will create a close packed array of hemispherical cavities (S. Moller and S. R. Forrest, *"Improved light outcoupling in organic light emitting devices employing ordered microlens arrays,"* J. Appl. Phys., vol. 91, pp. 3324, 2001. Y. Sun and S. R. Forrest, *"Organic light emitting devices with enhanced outcoupling via microlenses fabricated by imprint lithography,"* J. Appl. Phys., vol. 100, pp. 073106, 2006.

Next, an elastomeric polymer such as PDMS is poured into the Si mold to form a "positive" second mold. Once cured, the PDMS positive is removed from the Si and laid flat onto a glass substrate and is coated with metal such as Ti/Au to provide a hard but not "sticky" surface. The final step is to take a highly polished metal cylinder coated with approximately 5 mm thick conformal polymer such as BCB which fills in any defects in the metal roller, while providing a flat and uniform coating. Slight curing to drive off excess solvent and to provide a viscous but not hardened surface is helpful at this point. This pre-curing process may be accompanied by cylinder rotation to prevent thickening and running of the BCB to the lower side of the cylinder. The cylinder is then rolled over the surface of the metal-coated PDMS positive to replicate the cavity array on the Si wafer onto the cylindrical surface of the roller. Once the impression is made, the BCB is fully cured. Once again a Ti/Au coating may be applied to make the cavity array less "sticky" during use.

The process should allow for the transformation of the flat cavity array of the Si surface onto a cylindrical surface without pattern distortion (although small distortions are tolerable for our microlens array designs). The roller is then used to transfer the "negative" cavities onto the flat glass surface of the OLED substrate which has been precoated with a second polymer such as a transparent polyimide. This coating is cured after making the lens impression with the stamp.

It is clear that this process, at all steps of mold and lens formation, may be performed at very low pressures and maintains pattern resolutions without introducing parasitic distortions into the array itself. Continuous fabrication of through rolling of multiple substrates is also a straightforward extension of this process.

The molding process may be most readily used with cylindrical roller surfaces. Approximately 8 cm in circumference is one possible dimension. The process may be extended to other rollers, such as a 6" (approximately 15 cm) circumference rollers, and used to provide substrates for fabrication of OLEDs, such as completed WOLED panels onto the opposing (flat) substrate surface. Other dimensions may also be used. Substrate handling that does not result in damage to the microlens array is preferable.

A "Positive Pattern" is the pattern desired for the manufactured end product, for example the array of microlens that will be present on a finished light emitting device A "Negative Pattern" is the inverse of the positive pattern. A positive pattern and its negative should physically fit together. A relatively hard negative pattern can be pressed into a relatively soft material to create the positive pattern in the soft material. Similarly, a relatively hard positive pattern can be pressed into a relatively soft material to create the negative pattern in the soft material. Where a patterned roller is rolled over a surface to create a patterned end product, such as an array of microlenses, the patterned end product has a "positive pattern" and the roller has the corresponding "negative pattern."

A "curable material" is one that can have its properties, such as its hardness, changed by curing. There are various ways that a material can be cured. Baking and chemical treatment are two common ways to cure a material. Polymers that are cross-linked by a curing process, such as baking or chemical treatment, are a common example of a curable material.

A "conformal layer" is a layer of relatively uniform thickness. In the context of coating a roller with a conformal layer, a layer sufficiently uniform to allow the pattern to be subsequently formed around the entire circumference of the roller should be considered "conformal." The conformal layer should be able to fill in defects in the surface of the roller without transmitting those defects to the surface of the layer, while conforming to the general shape of the roller, which may be cylindrical. Variations in thickness away from the part of the roller that will be subsequently used to pattern microlenses should not be construed to negate the conformal nature of a layer.

"Hemispherical" means a shape having a surface that is approximately the shape of a part of a sphere. As used herein, the term "hemispherical" is not strictly limited to an exact half-sphere, and is intended to encompass shapes created by isotropic etching through a hole that is relatively small compared to the final etch pit (as opposed to a point), and/or where there are slight deviations from a perfect hemisphere. Hemispherical is also intended to encompass situations where there may be some overlap between adjacent spheres.

"Pre-curing" means slight curing to drive off excess solvent and to provide a viscous but not hardened surface. In many situations, an uncured but curable material as applied is a viscous liquid that runs due to gravity, without application of external stress. A "pre-cured." surface should have sufficient structural integrity to generally remain in place when not subject to external stress, but sufficient viscosity to readily adapt its shape to that of a mold when pressed against the mold.

The "diameter" of a microlens is the dimension across the base of the microlens. Where the base of the microlens is not circular, the "diameter" of the microlens is the average across all angles of lines running along the base and through the center of the microlens.

"Close-packed" means an array of features having the highest possible density, i.e., the features take up the largest possible fraction of the available area. For circles and hexagons, a "close-packed" array has a geometry similar to a two dimensional honeycomb. For squares, a grid is a close-packed array. Circles arranged in a grid are not close-packed, because the honeycomb geometry has higher density.

One problem that arises with OLEDs, as well as other types of light-emitting devices, is that many of the photons generated in the emissive layer(s) of the device do not ultimately exit the device. There are a number of undesirable mechanisms by which a photon may be trapped in a device. One such mechanism is waveguiding. For example, when a photon approaches the interface between the device and air, it may be waveguided and remain in the device if the angle at which the photon approaches the interface is not sufficiently perpendicular. One way to increase the number of photons that escape the device is to use a non-planar surface for the interface between the device and air. For example, microlenses may be formed on the surface of the device. One example of microlenses may be found in U.S. Pat. No. 6,984,934, which is incorporated by reference. A wide variety of microlens shapes and configurations may be used.

One issue that arises when using microlenses to enhance outcoupling is the difficulty and expense of fabrication. One way to inexpensively fabricate a microlens array is to use a patterned roller to create a pattern of microlenses in a malleable surface.

Method of Fabricating Roller

Conventional patterning techniques used for semiconductor processing may not work well with a roller, because the techniques are generally designed for use with a flat surface. Moreover, it may be difficult to simply make a pattern in a flat and flexible surface, and then bend the surface to attach the pattern to a roller.

Figure 1:
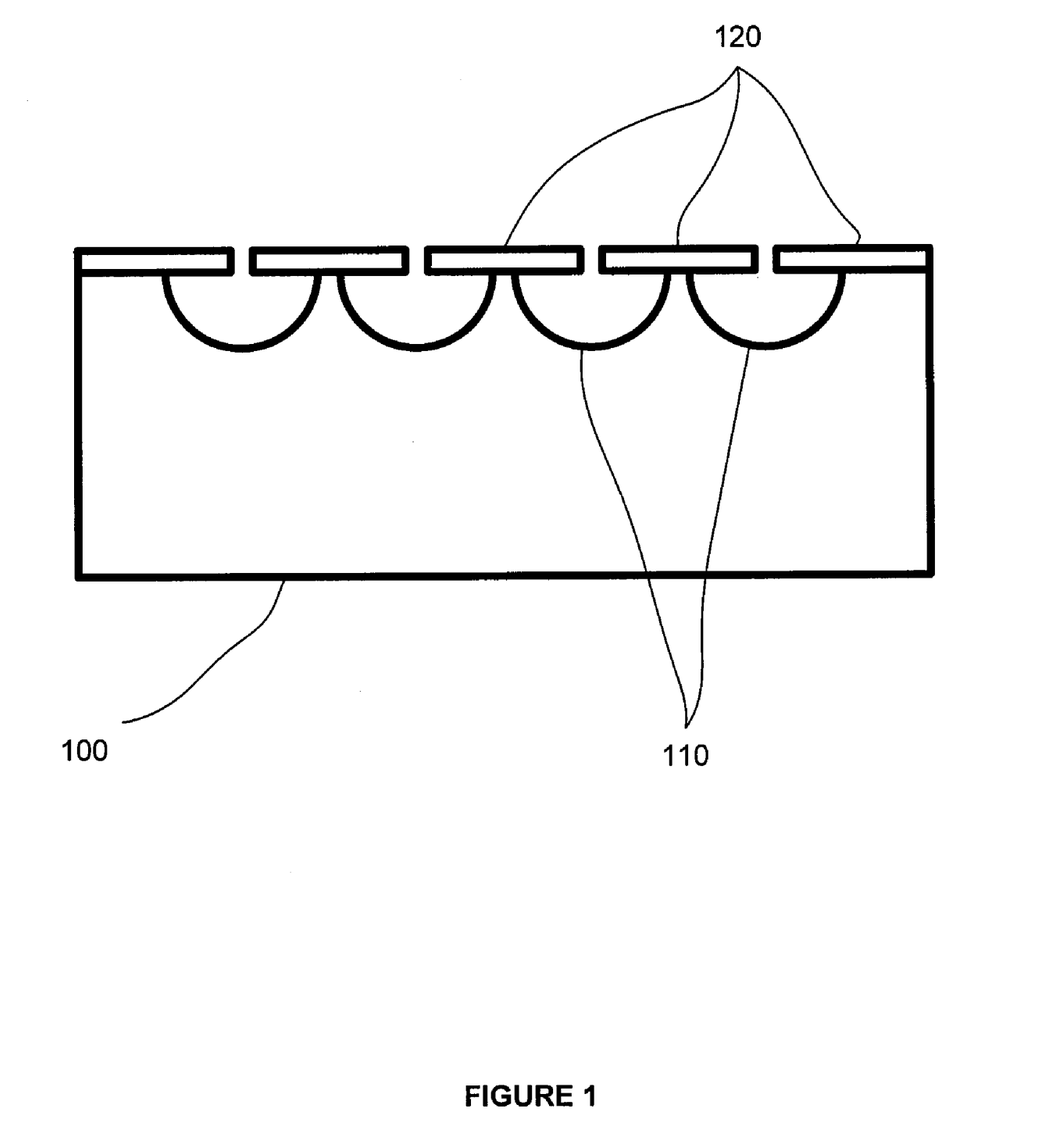
FIG. 1 shows a substrate having a negative pattern formed therein.

A method of making a patterned roller is provided, as illustrated in FIGS. 1-4. As illustrated in FIG. 1, a first mold 100 is formed having a negative of the pattern that is ultimately desired. For many desirable microlens shapes, a microlens may be formed by etching a flat mold surface through a hole in resist that is relatively small relative to the size of the microlens. Pits 110 are etched in a flat surface of a substrate through patterned mask 120 to form first mold 100. Pits 110 are etched in a "flat" surface of the substrate because the surface does not have significant curvature. After pits 110 are etched, patterned mask 120 may be removed to form first mold 100.

Etching pits 110 in a flat surface allows conventional etching processes to be used to create pits with highly controllable dimensions and shapes. Mask, etchant, and substrate material combinations for isotropic etching are well-known. For example, isotropic etching of flat glass substrates may be used to form hemispherical pits 110. Mask materials include photoresist, metal, $SiN_x$, and any number of other materials that can withstand the etchants. Graded photoresist masks can be useful for achieving exactly the mold profile desired to result in the highest outcoupling efficiency. Isotropic etchants for many glasses include plasma etchants and wet etchants. A silicon substrate may also be used in combination with particular etchants to achieve hemispherical pits 110.

While hemispherical microlenses, and hence isotropic etching processes, are preferred for the highest outcoupling efficiency, it is also possible to use combinations of etchants and substrate materials that result in anisotropic etching, and non-hemispherical pits 110. For example, pits having the negative of a mesa pattern with sloping walls may be readily attained with anisotropic etching, as may many other patterns. Silicon is one material that may be used with particular etchants to attain non-hemispherical pits 320. Wet etchants and plasma etchants are two common classes of etchants. Many combinations of etchants and substrates that result in isotropic or anisotropic pits, as well as the specific shape of the pits, are well known.

There are significant advantage of using etching processes on a flat substrate to form the negative pattern. First, etching processes on flat substrates are well known and have been intensively studied in the semiconductor industry, so it is possible to take advantage of that knowledge base to precisely adjust the shape of the microlens. Second, one of the most desirable microlens shapes, a hemisphere, is one of the simplest shapes to create by etching in a negative pattern. Third, because etching processes are so well known, close-packed arrays of microlenses, which is the most desirable array type, may be readily achieved. Fourth, desirable microlens diameters, such as 5 to 20 microns, and preferably 10 microns, are readily attainable with etching. However, the processes described herein may be used to create microlenses having diameters well above and well below the preferred range. Microlenses with different diameters may be preferred for certain applications. For example, microlenses having a diameter on the order of microns may be preferred for a computer monitor screen, television, or handheld video device, while much larger microlenses may be preferred for a billboard. Thus, the "micro" in "microlens" is not intended to limit the size.

Figure 2:
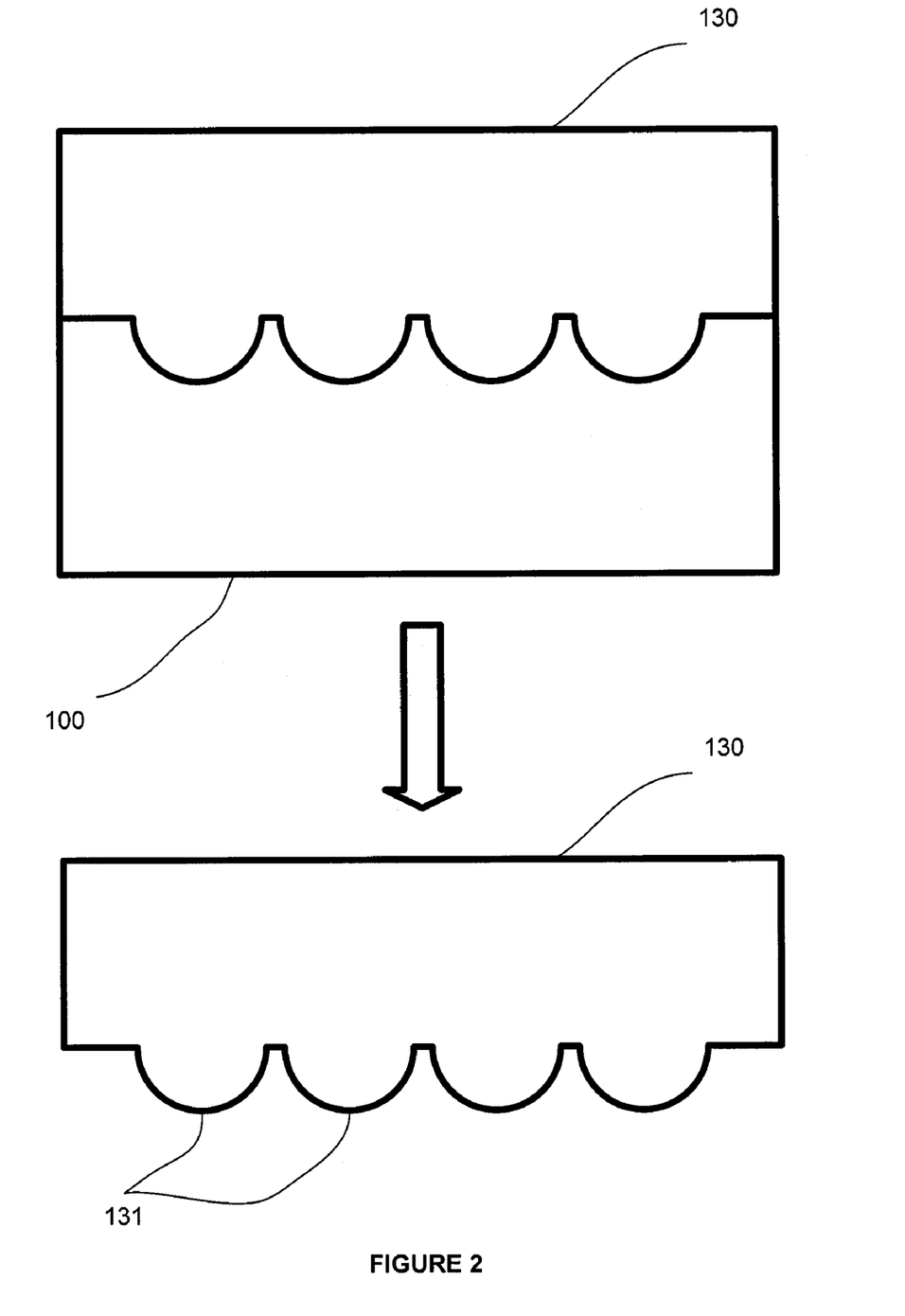
FIG. 2 shows the transfer of the negative pattern of FIG. 1 into a corresponding positive pattern.

After pits 110 are etched to form the first mold 100, they may optionally be coated with a thin layer of metal or other material to assist with subsequent separation of the second mold 130 from first mold 110.

As illustrated in FIG. 2, a second mold 130 is formed. A first curable material is poured into first mold 100, and then cured to lock in the shape of pits 110. After curing, second mold 130 is separated from first mold 100, i.e., the first curable material is removed from the first mold. Second mold 130 has bumps 131 in the positive pattern that corresponds to the negative pattern of first mold 100. Bumps 131 have approximately the shape of the final microlenses. Bumps 131 may have shapes corresponding to the various types of pits discussed earlier, including the preferred hemispherical shape as well as other shapes obtained by anisotropic etching.

Second mold 130 may optionally be coated with a thin layer of metal or other material to assist with subsequent separation of a second curable material from second mold 130 while the pattern is being transferred to the roller.

Figure 3:
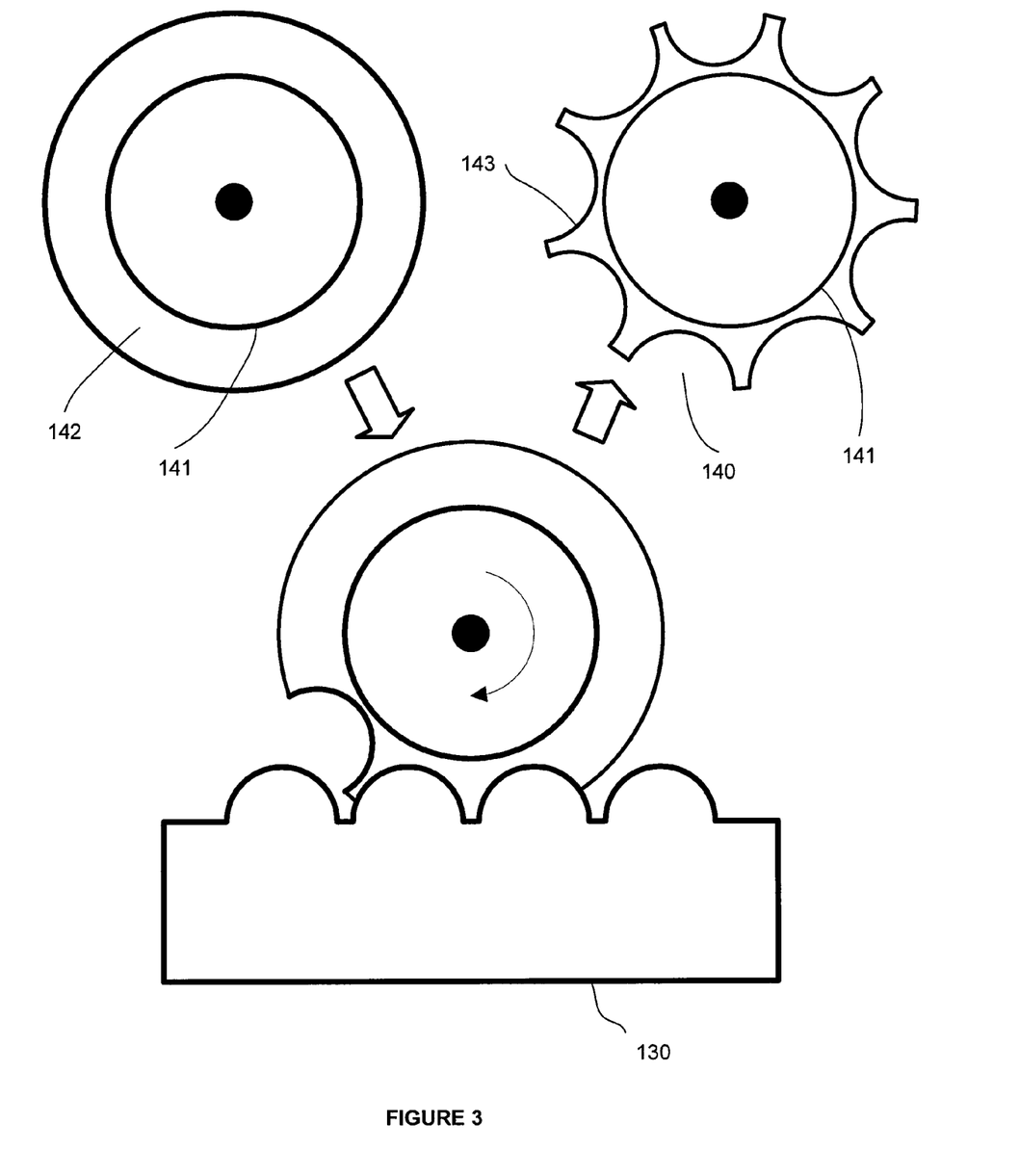
FIG. 3 shows the transfer of the positive pattern of FIG. 2 into a corresponding negative pattern on a patterned roller.

As illustrated in FIG. 3, a patterned roller is formed using second mold 130. First, a roller 141 is coated with a layer of a second curable material to form a coating 142. Coating 142 is preferably conformal in that it is sufficiently uniform to allow the pattern to be subsequently formed around the entire circumference of the roller. Coating 142 is preferably able to fill in any defects in the surface of the roller without transmitting those defects to the surface of the layer, while conforming to the general shape of the roller, which may be cylindrical. After being applied to roller 141, coating 142 may be pre-cured to drive off excess solvent and to provide a viscous but not hardened surface. In many situations, an uncured but curable material as applied to roller 141 is a viscous liquid that runs due to gravity, without application of external stress. A "pre-cured" surface should have sufficient structural integrity to generally remain in place when not subject to external stress, but sufficient viscosity to readily adapt its shape to that of a mold when pressed against the mold. Preferably, roller 141 is rotated during the pre-curing process to assist with achieving a conformal layer.

Next, as illustrated in FIG. 3, roller 141 coated with pre-cured coating 142 is rolled over second mold 130 to transfer the pattern to coating 142 to created patterned roller 140. As transferred to coating 142, the pattern is a "negative" pattern similar to that of first mold 100, but now in a surface having curvature. Specifically, patterned roller 140 has pits 143 similar in shape and size to pits 110, but on a curved surface. This is a significant difference, because many of the techniques used to generate the pattern in first mold 100 would not work well with a surface having curvature. After pits 143 are formed, the second curable material may be cured.

Patterned roller 140 may optionally be coated with a thin layer of metal or other material to assist with subsequent separation of patterned roller 140 from a transparent polymer when patterned roller 140 is used to create a pattern of microlenses.

The first and second curable materials may be selected from a wide variety of options. Elastomeric polymers are preferred for the first curable material. PDMS (polydimethylsiloxane) or h-PDMS are preferred elastomeric polymers. Benzocyclobutene (BCB) is a preferred polymer for the second curable material.

Materials used as coatings to assist with separation include metals such as Ti, Au, and alloys thereof.

A preferred dimension for cylinder 141 prior to scale-up is 15 cm. Larger diameters are preferred for commercial use. The length of cylinder 141 is preferably at least the width of the surface upon which microlenses are to be fabricated. The diameter cylinder 141 is preferably at least 10 times the diameter of pits 143, although much larger diameters may be used. Diameters of 1,000,000 times the diameter of pits 143, or larger, may be used. Metal is a preferred material for cylinder 141 because it is rigid, durable, readily available and readily machined into the desired shape. However, the pressure needed to impart the pattern of pits 143 into many malleable materials, such as an uncured transparent polymer, is relatively low, so many other materials or combinations of materials may be used for cylinder 141.

Figure 4:
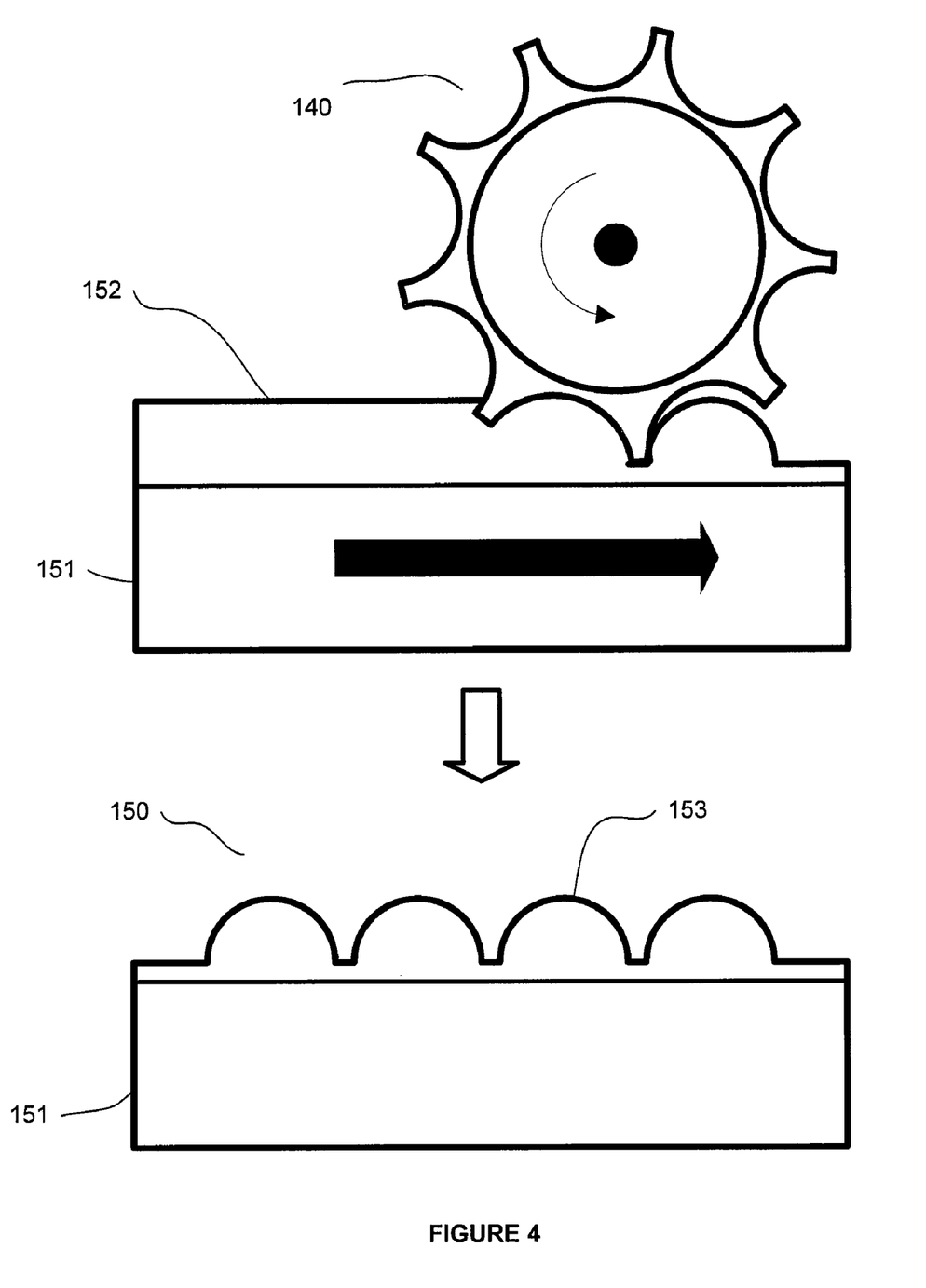
FIG. 4 shows the patterned roller of FIG. 3 being used to create an array of microlenses having the positive pattern.

As illustrated in FIG. 4, patterned roller 140 may be used to impart the positive pattern to form an array of microlenses 150. A substrate 151 may be coated with a third curable material 152, which may or may not be pre-cured. Patterned roller 140 is rolled over substrate 151 to create a pattern of microlenses 153 in third curable material 152. Third curable material 152 is then cured. to form array of microlenses 150.

Third curable material 152 is preferable transparent after curing. Polymers that are transparent when cured are preferred. Polyimides that are transparent when cured are particularly preferred. The first, second and third curable materials may be the same material, or they may be different materials.

Where a pattern is being transferred to an uncured or pre-cured material, the pressures needed for transfer are generally quite low. This is advantageous because the pattern may be transferred without introducing distortions into the pattern, and ultimately into the patterned array of microlenses. While distortion is not preferred, some distortion can be tolerated.

Array of microlenses 150 may be particularly useful to increase the outcoupling efficiency of organic light emitting devices (OLEDs). Array of microlenses may be applied to a substrate used for the fabrication of OLEDs before the OLEDs are fabricated. If the curing process for third curable material 152 is sufficiently gentle that it does not damage the OLEDs, the array of microlenses may also be applied after the OLEDs are fabricated. Array of microlenses 150 may also be applied to a substrate separate from that used to fabricate OLEDs, which is subsequently laminated or otherwise attached to a substrate used to fabricate OLEDs. Array of microlenses 150 may be used for any other application where microlenses are useful.

Generally, an OLED comprises at least one organic layer disposed between and electrically connected to an anode and a cathode. When a current is applied, the anode injects holes and the cathode injects electrons into the organic layer(s). The injected holes and electrons each migrate toward the oppositely charged electrode. When an electron and hole localize on the same molecule, an "exciton," which is a localized electron-hole pair having an excited energy state, is formed. Light is emitted when the exciton relaxes via a photoemissive mechanism. In some cases, the exciton may be localized on an excimer or an exciplex. Non-radiative mechanisms, such as thermal relaxation, may also occur, but are generally considered undesirable.

Figure 5:
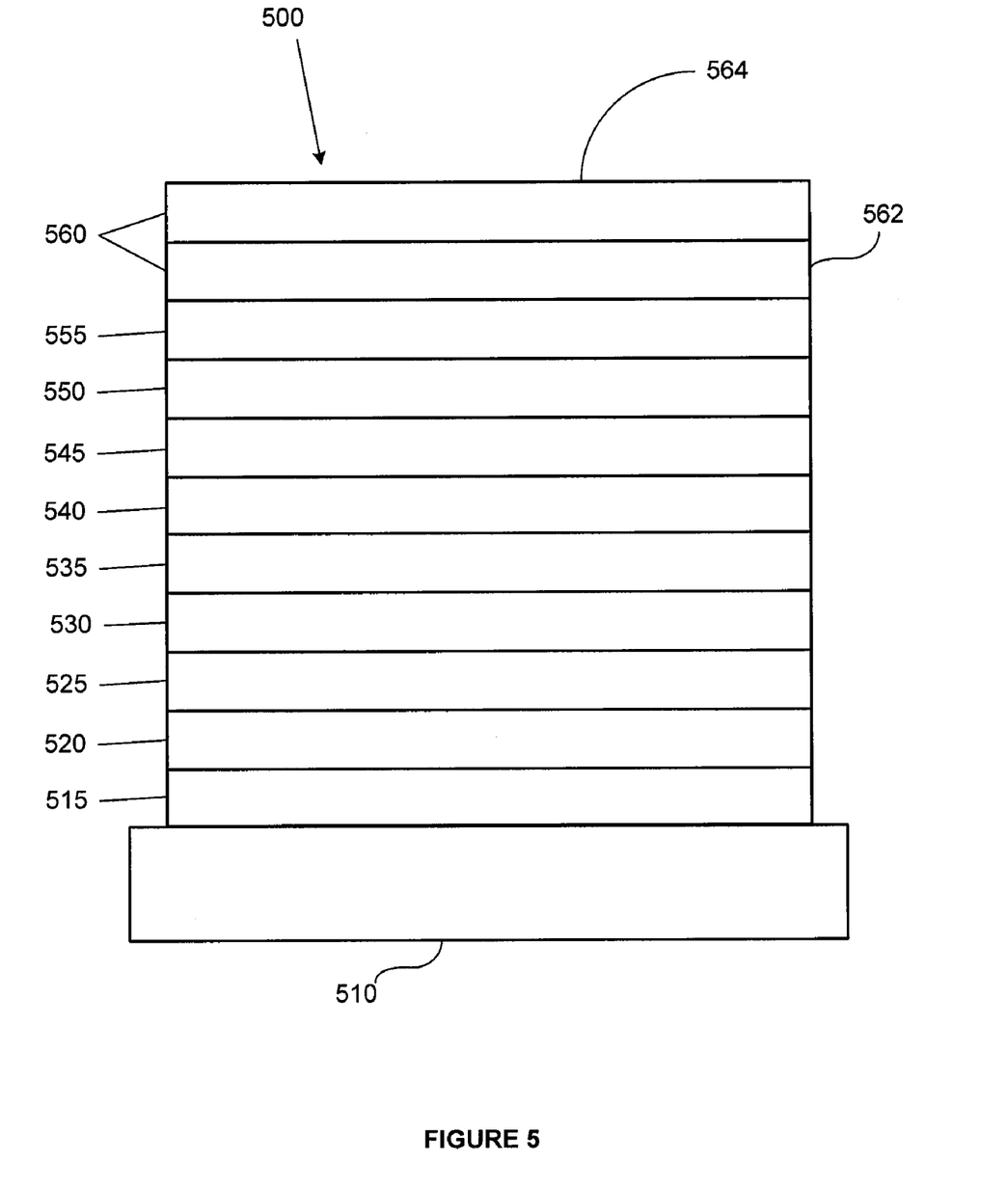
FIG. 5 shows an organic light emitting device.

FIG. 5 shows an organic light emitting device 500. The figures are not necessarily drawn to scale. Device 500 may include a substrate 510, an anode 515, a hole injection layer 520, a hole transport layer 525, an electron blocking layer 530, an emissive layer 535, a hole blocking layer 540, an electron transport layer 545, an electron injection layer 550, a protective layer 555, and a cathode 560. Cathode 560 is a compound cathode having a first conductive layer 562 and a second conductive layer 564. Device 500 may be fabricated by depositing the layers described, in order. The properties and functions of these various layers, as well as example materials, are described in more detail in U.S. Pat. No. 7,279,704 at cols. 6-10, which are incorporated by reference.

Examples for each of these layers are available. For example, a flexible and transparent substrate-anode combination is disclosed in U.S. Pat. No. 5,844,363, which is incorporated by reference in its entirety. An example of a p-doped hole transport layer is m-MTDATA doped with $F_4$-TCNQ at a molar ratio of 50:1, as disclosed in U.S. Patent Application Publication No. 2003/0230980, which is incorporated by reference in its entirety. Examples of emissive and host materials are disclosed in U.S. Pat. No. 6,303,238 to Thompson et al., which is incorporated by reference in its entirety. An example of an n-doped electron transport layer is BPhen doped with Li at a molar ratio of 1:1, as disclosed in U.S. Patent Application Publication No. 2003/0230980, which is incorporated by reference in its entirety. U.S. Pat. Nos. 5,703,436 and 5,707,745, which are incorporated by reference in their entireties, disclose examples of cathodes including compound cathodes having a thin layer of metal such as Mg:Ag with an overlying transparent, electrically-conductive, sputter-deposited ITO layer. The theory and use of blocking layers is described in more detail in U.S. Pat. No. 6,097,147 and U.S. Patent Application Publication No. 2003/0230980, which are incorporated by reference in their entireties. Examples of injection layers are provided in U.S. Patent Application Publication No. 2004/0174116, which is incorporated by reference in its entirety. A description of protective layers may be found in U.S. Patent Application Publication No. 2004/0174116, which is incorporated by reference in its entirety.

Figure 6:
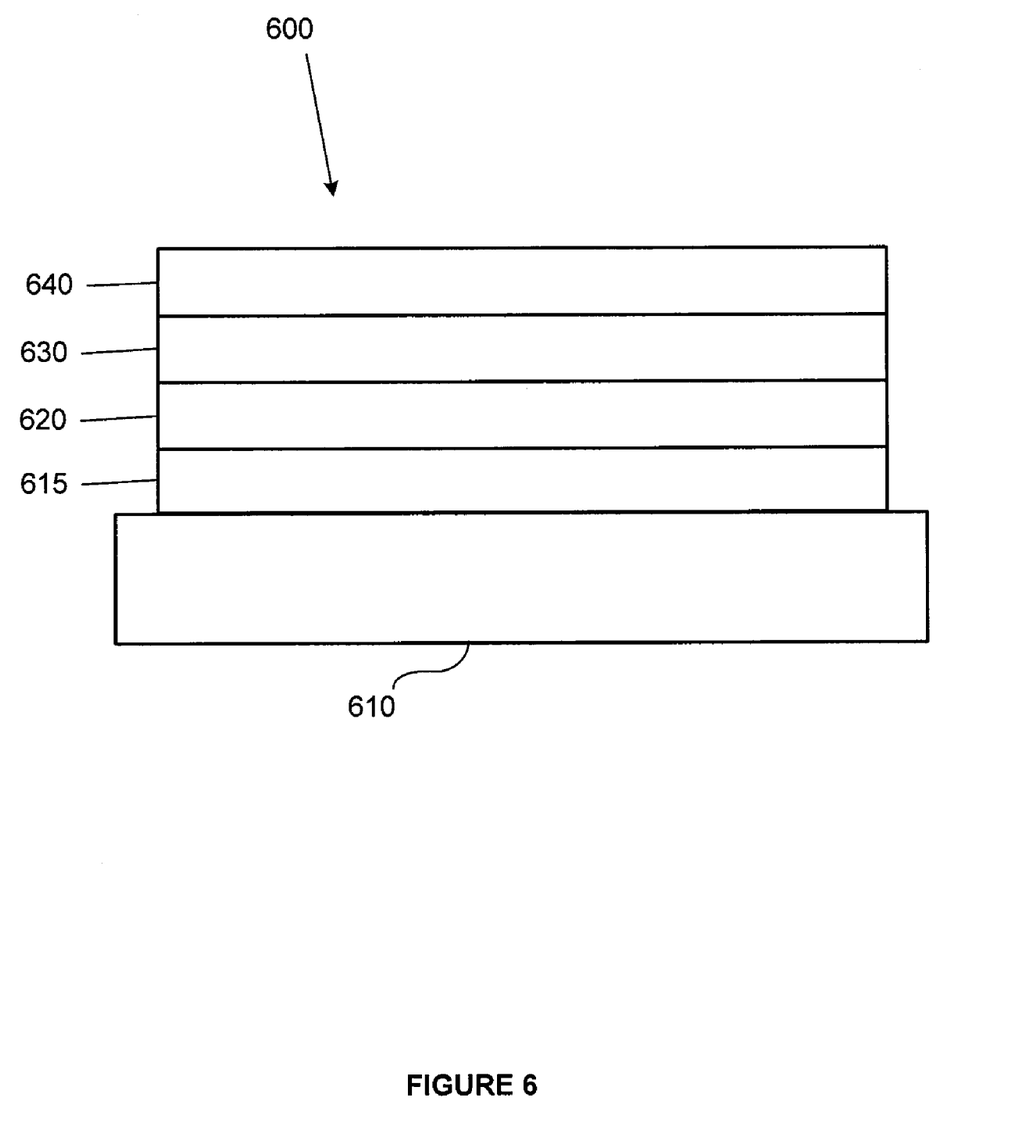
FIG. 6 shows an inverted organic light emitting device that does not have a separate electron transport layer.

FIG. 6 shows an inverted OLED 600. The device includes a substrate 610, a cathode 615, an emissive layer 620, a hole transport layer 625, and an anode 630. Device 600 may be fabricated by depositing the layers described, in order. Because the most common OLED configuration has a cathode disposed over the anode, and device 600 has cathode 615 disposed under anode 630, device 600 may be referred to as an "inverted" OLED. Materials similar to those described with respect to device 500 may be used in the corresponding layers of device 600. FIG. 6 provides one example of how some layers may be omitted from the structure of device 500.

The simple layered structure illustrated in FIGS. 5 and 6 is provided by way of non-limiting example, and it is understood that embodiments of the invention may be used in connection with a wide variety of other structures. The specific materials and structures described are exemplary in nature, and other materials and structures may be used. Functional OLEDs may be achieved by combining the various layers described in different ways, or layers may be omitted entirely, based on design, performance, and cost factors. Other layers not specifically described may also be included. Materials other than those specifically described may be used. Although many of the examples provided herein describe various layers as comprising a single material, it is understood that combinations of materials, such as a mixture of host and dopant, or more generally a mixture, may be used. Also, the layers may have various sublayers. The names given to the various layers herein are not intended to be strictly limiting. For example, in device 600, hole transport layer 625 transports holes and injects holes into emissive layer 620, and may be described as a hole transport layer or a hole injection layer. In one embodiment, an OLED may be described as having an "organic layer" disposed between a cathode and an anode. This organic layer may comprise a single layer, or may further comprise multiple layers of different organic materials as described, for example, with respect to FIGS. 5 and 6.

Devices fabricated in accordance with embodiments of the invention may be incorporated into a wide variety of consumer products, including flat panel displays, computer monitors, televisions, billboards, lights for interior or exterior illumination and/or signaling, heads up displays, fully transparent displays, flexible displays, laser printers, telephones, cell phones, personal digital assistants (PDAs), laptop computers, digital cameras, camcorders, viewfinders, micro-displays, vehicles, a large area wall, theater or stadium screen, or a sign. Various control mechanisms may be used to control devices fabricated in accordance with the present invention, including passive matrix and active matrix. Many of the devices are intended for use in a temperature range comfortable to humans, such as 18 degrees C. to 30 degrees C., and more preferably at room temperature (20-25 degrees C.).

The figures generally may not be drawn to scale, Particularly, the relative thicknesses of various layers may be different from what is illustrated, and the preferred diameter of roller 141 may be much larger in comparison to the scale of pits 143 than illustrated. The dimensions of the illustrations have been selected for ease of understanding rather than technical accuracy.

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore includes variations from the particular examples and preferred embodiments described herein, as will be apparent to one of skill in the art. It is understood that various theories as to why the invention works are not intended to be limiting.

The invention claimed is:

1. A method of making a patterned roller, comprising:
   forming a first mold having a negative pattern by etching pits in a flat mold surface with an etching process;
   forming a second mold having a positive pattern by pouring a first curable material into the first mold;
   curing the first curable material;
   removing the first curable material from the first mold; and
   forming the patterned roller having the negative pattern by coating a roller with a layer of a second curable material;
   pre-curing the second curable material to provide a viscous but not hardened surface;
   coating the first curable material with a metal;
   after coating the first curable material with the metal, rolling the roller over the second mold to create the negative pattern in the second curable material; and
   curing the second curable material.

2. The method of claim 1, wherein the etching process is isotropic and the pits are hemispherical.

3. The method of claim 2, wherein the first mold comprises a glass.

4. The method of claim 2, wherein the first mold comprises silicon.

5. The method of claim 1, wherein the etching process is anisotropic.

6. The method of claim 5 wherein the pits have a mesa shape with sloping walls.

7. The method of claim 6, wherein the first mold is silicon.

8. The method of claim 1, wherein the positive pattern comprises an array of microlenses having a diameter of 5 microns to 20 microns.

9. The method of claim 8, wherein the positive pattern comprises an array of microlenses having a diameter of about 10 microns.

10. The method of claim 8, wherein the microlenses are in a close-packed array.

11. The method of claim 1, wherein the first curable material is an elastomeric polymer.

12. The method of claim 11, wherein the first curable material is PDMS or h-PDMS.

13. The method of claim 1, wherein the first curable material is coated after curing and before forming the patterned roller, and the second curable material is coated after curing.

14. The method of claim 13, wherein at least one of the first and second curable materials are coated with a metal selected from the group consisting of Ti, Au, and alloys thereof.

15. The method of claim 1, wherein the second curable material is BCB.

16. The method of claim 1, wherein the roller is rotated during pre-curing of the second curable material.

17. A method of making a patterned roller, comprising:
   forming a first mold having a negative pattern by etching pits in a flat mold surface with an etching process;
   forming a second mold having a positive pattern by pouring a first curable material into the first mold;
   curing the first curable material;
   removing the first curable material from the first mold; and
   forming the patterned roller having the negative pattern by coating a roller with a layer of a second curable material;
   pre-curing the second curable material to provide a viscous but not hardened surface;
   rolling the roller over the second mold to create the negative pattern in the second curable material;
   curing the second curable material; and
   coating the second curable material with a metal.

18. The method of claim 17, wherein the metal comprises one of Ti, Au and alloys thereof.

19. The method of claim 1, wherein the metal comprises one of Ti, Au and alloys thereof.

20. The method of claim 1, further comprising coating the second curable material with a second metal.

21. The method of claim 20, wherein the second metal comprises one of Ti, Au and alloys thereof.

* * * * *